Apr. 3, 1923.
I. SCHWARTZ
WHEEL TRUING GAUGE
Filed Jan. 23, 1922
1,450,518
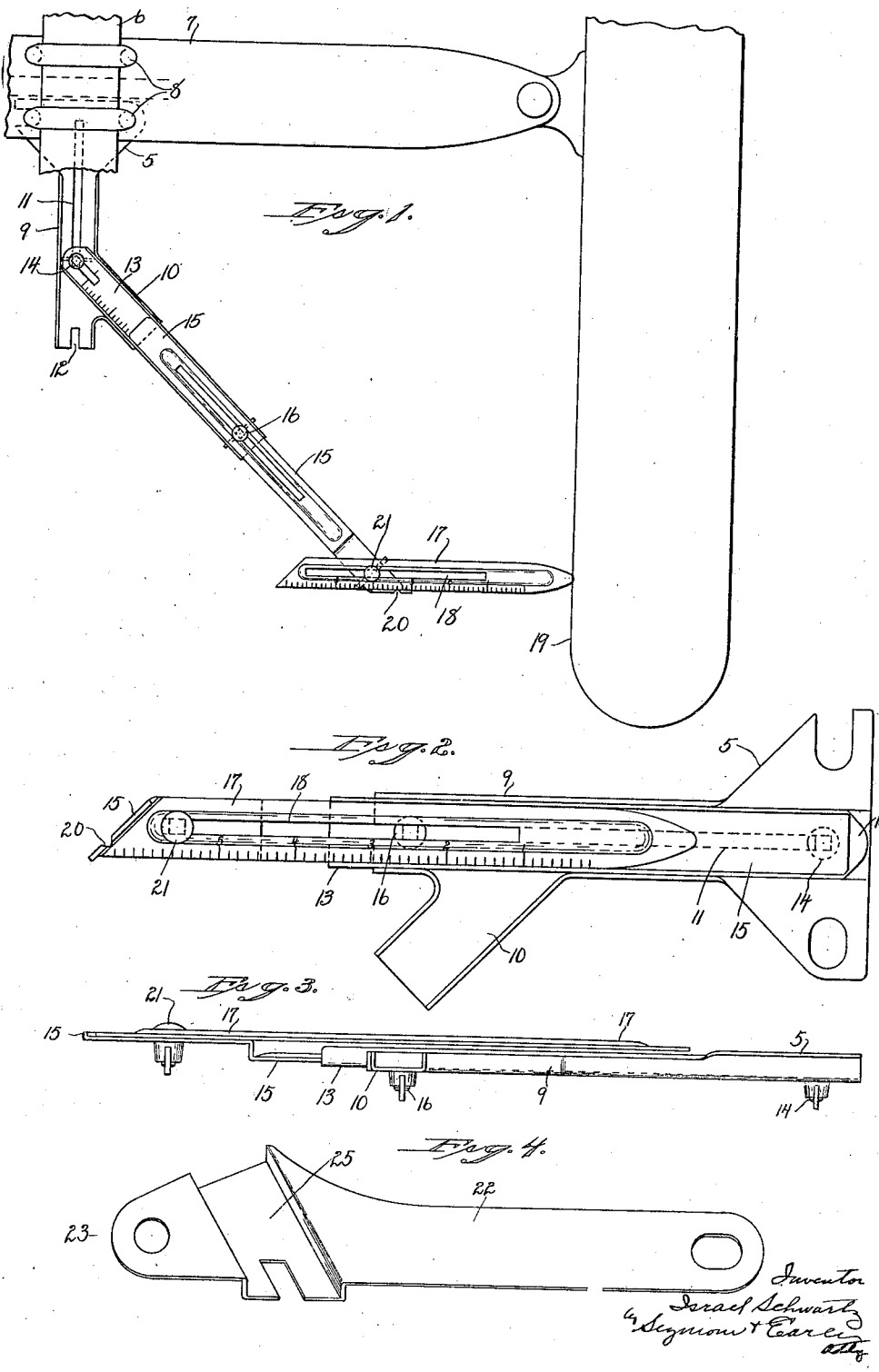

Patented Apr. 3, 1923.

1,450,518

UNITED STATES PATENT OFFICE.

ISRAEL SCHWARTZ, OF DANBURY, CONNECTICUT.

WHEEL-TRUING GAUGE.

Application filed January 23, 1922. Serial No. 531,129.

*To all whom it may concern:*

Be it known that I, ISRAEL SCHWARTZ, a citizen of the United States, residing at Danbury, in the county of Fairfield and State of Connecticut, have invented a new and useful Improvement in Wheel-Truing Gauges; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a wheel truer constructed in accordance with my invention and shown in its operating position.

Fig. 2 a plan view of the same, with the parts shown in a retired position.

Fig. 3 a side view of the same.

Fig. 4 a perspective view of a modified form of bracket.

This invention relates to improvement in wheel truing gages. In placing demountable rims on automobile wheels, it is very desirable that they should be set true, and it often happens that when a car has been driven over rough roads, the rims get slightly out of place, and, consequently, do not run true, which tends to place unnecessary wear upon the rims. Various devices have been arranged to determine the alignment of rims, but such devices are usually independent of the car and not generally carried with the car. The object of this invention is to provide a truing device which may be permanently fixed adjacent to the edge of the wheels, so that, at any time, the wheels may be tested, and the invention consists in the construction and arrangement of parts as will be hereinafter described and particularly recited in the claim.

In carrying out my invention, I employ a bracket 5, which is adapted to be permanently secured to a car. As shown in Figure 1 of the drawings, this bracket is secured to one of the springs 6, by shackles 8, which are employed to connect the springs with the axle 7. This bracket includes an outwardly-projecting grooved main support 9 with a branch support 10. The support 9 is formed with a longitudinal slot 11 and with a notch 12 in its outer end. Adapted to rest in the support 9 is a graduated slide 13 connected with the support by a bolt 14 passing through the slot 11. This slide closely fits the grooved support 9 and is adapted to rest in the branch support 10. Mounted in the slide 13 is an arm 15, which is adjustably connected with the slide in a plane parallel therewith by a bolt 16, one end of which enters the notch 12, and adjustably connected with the outer end of the arm in a plane parallel therewith is a finger 17 formed with a slot 18, by which it may be adjusted on the end of the arm, so that its outer end extends against the rim 19 of one of the wheels. This finger has a graduated scale on one edge to register with a notch 20 formed in the outer end of the arm to which the finger is connected by a bolt 21. When not in use, the finger 17 is turned into line with the arm 16, and this arm is moved into the slide, which is then arranged in the straight portion of the bracket, as shown in Figures 2 and 3 of the drawings, so that the device is compactly housed and practically out of sight.

It will be understood that one of these devices may be arranged adjacent to each of the wheels, or a car may be provided with four brackets, and a single slide, arm and finger may be successively applied to the brackets to test the position of the wheels. The graduations facilitate the quick adjustment of the parts to their proper position for the particular car on which the devices are used.

It will be understood, also, that the form of bracket will vary with different makes of cars. Thus, for instance, on a Ford car, I will use a bracket 22, as shown in Figure 4 of the drawings, one end 23 of which is adapted to be connected with the usual bolt securing the spring perch, while the other end is provided with a slot for connection with the usual spindle bolt. This bracket is provided with a channel 25, like the grooved support 9, and is adapted to receive the slide 15, arm 16 and finger 17, as above described. By permanently attaching the device to a car, it is always ready for use and the wheels may be tested at the convenience of the driver.

I claim:

A wheel rim truer, comprising a bracket adapted to be secured to a fixed point adjacent to a vehicle wheel and provided with an outwardly-extending main support and a branch support extending at an angle thereto, said main support formed with a longitudinal groove and the branch support with a longitudinal groove intersecting the groove in the main support, a slide adjustably connected with said main support and adapted to rest in either of said grooves, an arm adjustably connected with said slide in a plane parallel therewith, and a finger adjustably connected with said arm in a plane parallel therewith.

In testimony whereof, I have signed this specification in the presence of two subscribing witnesses.

ISRAEL SCHWARTZ.

Witnesses:
 LOUIS K. TAYLOR,
 WALTER D. HAGER.